United States Patent [19]

Anderson et al.

[11] 4,142,595

[45] Mar. 6, 1979

[54] SHALE STABILIZING DRILLING FLUID

[75] Inventors: Duane B. Anderson, Tulsa; Carl D. Edwards, Vinita, both of Okla.

[73] Assignee: Standard Oil Company (Indiana), Chicago, Ill.

[21] Appl. No.: 876,976

[22] Filed: Feb. 13, 1978

Related U.S. Application Data

[63] Continuation-in-part of Ser. No. 776,017, Mar. 9, 1977, abandoned.

[51] Int. Cl.$^2$ .............................................. C09K 7/02
[52] U.S. Cl. ................................ 175/72; 252/8.5 A; 252/8.5 C
[58] Field of Search ............. 252/8.5 A, 8.5 B, 8.5 C; 175/65, 72

[56] References Cited

U.S. PATENT DOCUMENTS

| | | | |
|---|---|---|---|
| 1,460,788 | 7/1923 | Carmen | 252/8.5 |
| 1,807,082 | 5/1931 | Boynton | 252/8.5 |
| 2,812,161 | 11/1957 | Mayhew | 252/8.5 X |
| 3,017,351 | 1/1962 | Scott et al. | 252/8.5 |
| 3,360,461 | 12/1967 | Anderson et al. | 252/8.5 |
| 3,723,311 | 3/1973 | Lummus et al. | 252/8.5 |
| 3,852,201 | 12/1974 | Jackson | 252/8.5 |
| 3,953,336 | 4/1976 | Daigle | 252/8.5 |

*Primary Examiner*—Herbert B. Guynn
*Attorney, Agent, or Firm*—Robert B. Stevenson; Arthur McIlroy

[57] ABSTRACT

A process and composition are described for use in drilling shale and especially in drilling the troublesome types of shale which heretofore have been impossible to drill effectively. The aqueous drilling fluid of this invention so effectively stabilizes the shale that additions to maintain the special drilling fluid can be discontinued or drastically reduced, once the shale formation has been penetrated and drilling below the shale could even be done with conventional drilling fluids.

The drilling fluid contains between about 0.2 to 1.5 pounds per barrel of flaxseed gum together with potassium and/or ammonium salts. The potassium and/or ammonium salts are used in quantities to provide a concentration of the cation of the salt of at least 10,000 ppm. As the drilling fluid is a non-clay type, a non-clay viscosifier is used. Preferably, the cation concentration is tailored to drilling fluid salinity such that the cation concentration in parts per million is approximately equal to at least $10,000 \times (1 + 0.025 \times$ the sodium chloride salinity in percent saturation).

8 Claims, No Drawings

SHALE STABILIZING DRILLING FLUID

CROSS REFERENCES TO RELATED APPLICATIONS

This is a continuation-in-part of a parent case, Ser. No. 776,017, which was filed Mar. 9, 1977 and is now abandoned.

BACKGROUND OF THE INVENTION

This invention relates to drilling of wells and particularly to drilling fluids and their use to allow drilling through shale formations.

Drilling of shale is a very old problem. One review of the U.S. patent literature indicates that about 800 different substances have been disclosed for drilling shales in the patents issuing prior to 1954. Flaxseed gum (U.S. Pat. No. 1,807,082), gilsonite (U.S. Pat. No. 2,812,161), and potassium chloride (U.S. Pat. No. 1,460,788) are among the various additives used for this purpose.

The technique of using flaxseed gum and the technique of using potassium or ammonium salts are both old. There are some troublesome shales which neither of these techniques by itself allows to be drilled effectively.

In U.S. Pat. No. 3,017,351 issued to Scott, Anderson, and Park on Jan. 16, 1962, the use of at least 3 pounds per barrel of water-soluble ammonium and potassium salts is taught to prevent swelling of shale and to decrease the tendency of shale to slough in clear-water drilling. That patent also teaches the use of a water-soluble amine and an acrylamide polymer hydrolyte to provide a coating of a protective film on the surface of the shale to prevent softening and breaking of the shale by mechanical action. The use of such combinations of chemicals in a clay-based mud, however, is not practiced because the inorganic salts involved would flocculate the clays being used for viscosity and fluid loss control, resulting in undesirably thick muds, high fluid loss, and thick filter cake which tends to stick the drill string.

The traditional method of drilling with a saltwater fluid or with any kind of salt contamination was to formulate an attapulgite clay-based mud using starch as a fluid loss additive, but such a mud resulted in very slow drilling rates. U.S. Pat. No. 3,723,311, issued to Lummus and Edwards on Mar. 27, 1973, teaches an alternate saltwater drilling technique using a non-clay based mud containing flaxseed gum, gilsonite, and asbestos. The viscosity, fluid loss, and filter cake thickness of the fluid of that patent are unaffected by salt content and faster drilling characteristics were obtained. That patent does not teach, however, that any particular combinations of salts are necessary for shale stabilization, but, on the contrary, states that water-soluble salt content may be anywhere from zero to saturation. The only use of salt taught by that patent is the use of saturated salt solution to prevent enlargement of the borehole by preventing the dissolving of drilled salt sections, which are, of course, mostly sodium chloride.

Despite the large number of substances which have been used in drilling through shale sections, certain shales are still encountered which none of the prior art practices allow to be drilled effectively. The Montrose shale, which is being encountered in the North Sea, is an example of such a shale. With shales of this kind, difficulties, such as sloughing hole and sticking of the drill bit, continue to be encountered.

When such shales are drilled by conventional techniques, additions to maintain the shale-stabilizing drilling fluid must be continued to be made while drilling below the shale formation as (unless an additional casing is run) the drilling fluid is still in contact with the shale formation.

SUMMARY OF THE INVENTION

The present invention contemplates a novel, non-clay based aqueous drilling fluid and the use thereof in a shale environment. Typically, the fluid contains 0.2 to 1.5 pounds per barrel of flaxseed gum and at least one salt having a cation selected from the group consisting of potassium and ammonium, with the cation concentration of potassium and/or ammonium being at least 10,000 ppm. A non-clay viscosifier is also used.

Preferably, the cation concentration of the salt additive in parts per million is at least $10,000 \times (1 + 0.025 \times$ the percent of saturation of sodium chloride in the drilling fluid). For sea water, the cation concentration is desirably between 20,000 and 30,000 ppm. Preferably, gilsonite is also added to the drilling fluids when formation evaluation considerations don't make the use of gilsonite impractical. The use of this combination provides long-lasting stabilization of the shale and the drilling fluid can be used (in contact with the shale formation) to drill formations beneath the shale without additions of further shale-stabilizing agents.

DESCRIPTION OF THE PREFERRED EMBODIMENTS

While troublesome shales cannot be effectively drilled using prior art techniques, they can be drilled in accordance with our invention, using the combination of flaxseed gum and salts of either potassium or ammonium (or both). This is quite unexpected as neither the flaxseed gum nor the salt(s) alone would allow the shale to be effectively drilled.

The flaxseed gum is a component of flax meal and while the flaxseed gum can be extracted and used in the amounts specified herein, it is generally convenient to add the flaxseed gum to the drilling fluid in the form of flax meal. As only approximately 10% by weight of the flax meal is flaxseed gum, a correspondingly greater amount of the meal should be added. As used herein, the flaxseed gum (or flax meal) is not a viscosifier. The desired viscosity is to be obtained by adding non-clay viscosifiers, such as hydroxyethyl cellulose, carboxymethyl cellulose, or hydroxyethyl cellulose plus biopolymer. As mentioned previously, the salts used herein tend to precipitate clays and, thus, clay viscosifiers are not appropriate.

In order to evaluate drilling-fluid (or mud) compositions under controlled conditions, an extensive series of tests were run to simulate the chemical and mechanical effects of drilling on various shales. In these tests, plus 10, minus 4 screened samples of various types of shale were subjected to 16 hours of mechanical agitation (rolling) in particular compositions of fluid. The shale was then filtered onto a 30-mesh screen and weighed to determine the percentage which remained. This remainder was then agitated in fresh water for 2 hours and again filtered and weighed to determine the amount still remaining. The first portion of this procedure provides a measure of the chemical and mechanical properties of the various shales as stabilized by the individual drilling fluid. The fresh-water portion of the test provides a measure of the degree to which the shale is permanently stabilized such that conventional drilling fluids might be used after the shale formation has been penetrated.

Table I below shows the composition in weight percent of the various shales which were used in the tests. The "MBT" values (shown in parentheses) are the Methylene Blue Test results as determined by the API Standard Procedure for Testing Drilling Fluids using 100 pounds of shale per barrel of water, and are a measure of the cation capacity of the shale. This value has been found to be related to the rate of salt addition necessary to maintain the salt concentration during drilling. All of the shales shown in Table I are relatively difficult to drill, even though the MBT values vary widely.

TABLE I

| Shale Composition | Coal Pit* | South Texas* | Thermopolis* | Fuson* |
|---|---|---|---|---|
| Quartz | 49% | 59% | 63% | 44% |
| Feldspar | 4 | 6 | 8 | trace |
| Calcite | | 15 | | |
| Siderite | 2 | | | |
| Gypsum | | | 4 | 1 |
| Kaolinite | 12 | | 7 | |
| Illite | 18 | | 6 | |
| Chlorite | 15 | 8 | 2 | |
| Montmorillonite | | | 15 | 55 |
| Mixed Layer Illite/Mont. | | 12 | | |
| *(MBT Value) | (6) | (15) | (24) | (31.5) |

Table II shows the results of shale rolling tests used to determine the degree of mechanical stability imparted to Coal Pit type shale (a low MBT shale) by several commercially available fluid additives. The second column (2 hr Tap Water) is an indication if the stabilization is relatively permanent, and thus that the cost of maintaining the mud system could be reduced by using a less expensive, conventional drilling fluid, once the troublesome shale section is drilled. Ideally, of course, the recovery should be 100%. Comparison of actual drilling results with such tests has indicated that recovery values over 85% are excellent, 70% to 85% is good, 55% to 70% is somewhat effective (fair), and under 55% is questionable in terms of whether the treatment would be effective in the field.

TABLE II

Shale: Coal Pit
Water: Tulsa Tap
Material Concentration: 1 lb/bbl

| Material | Shale Recovery 16 hr wt.% | 2 hr Tap Water wt.% |
|---|---|---|
| Lignosulfonate | 27 | 24 |
| Lignite | 8 | 7 |
| Sodium Polyacrylate Fluid Loss Reducer | 28 | 25 |
| Modified Starch | 33 | 31 |
| Cellulosic Polymer | 65 | 55 |
| Xanthan Gum | 79 | 67 |
| Dual Action Polymer | 66 | 55 |
| Selective-flocculant | 93 | 76 |
| Ammonium Polyacrylate (High Mol Wt.) | 95 | 75 |
| Sodium Polyacrylate (High Mol Wt.) | 93 | 52 |
| Flaxseed Gum | 94 | 85 |

It can be seen from Table II that 4 chemicals are excellent in this Coal Pit shale (selective flocculant, ammonium polyacrylate, sodium polyacrylate, and flaxseed gum) at the end of 16 hours in the stabilizing fluid. Flaxseed gum meal remains excellent in the tap water test (column 2) run afterwards, and thus is effective by itself for this low MBT type of shale.

Table III shows the effect of inorganic salts on shale stability and demonstrates that potassium or ammonium cations have a permanent effect on preventing hydration of this shale with a high MBT value. This Fuson shale is one of the most troublesome.

TABLE III

Shale: Fuson
Water: Tulsa Tap
Salt Concentration: 15 lb/bbl

| Salt | Shale Recovery 16 hr wt.% | 2 hr Tap Water wt.% |
|---|---|---|
| None | 45.2 | 25.6 |
| Sodium Chloride | 66.2 | 29.6 |
| Calcium Chloride | 68.6 | 55.4 |
| Magnesium Chloride | 66.6 | 30.8 |
| Potassium Chloride | 73.4 | 69.8 |
| Ammonium Sulfate | 69.4 | 66.6 |
| Diammonium Phosphate | 70.0 | 67.4 |
| Synthetic Sea Water | 71.2 | 26.2 |
| Sat'd. Sodium Chloride | 75.2 | 25.8 |

It can be seen from Table III that all salts are somewhat effective at a concentration of 15 pounds per barrel; however, only potassium chloride, ammonium sulfate, and di-ammonium phosphate remain effective in tap water after the initial treatment. Even these, when used without flax meal, are only fair in performance.

Table IV shows the performance of 5 pounds per barrel of flax meal (or about 0.5 pound per barrel of flaxseed gum) and the performance of 25 pounds per barrel of potassium chloride (note that the potassium chloride concentration has been raised from the 15 pounds per barrel of Table III).

TABLE IV

| | | Shale Recovery - wt.% | | | | | |
| | | Tap Water | | 25 ppb KCl | | 5 ppb Flaxmeal | |
| Shale | (MBT) | 16 hr | 2 hr | 16 hr | 2 hr | 16 hr | 2hr |
|---|---|---|---|---|---|---|---|
| Coal Pit | (6) | 15.0 | 13.3 | 39.3 | 32.8 | 77.6 | 60.5 |
| South Texas | (16.5) | 21.1 | 20.7 | 69.2 | 58.3 | 72.6 | 25.4 |
| Thermopolis | (24) | 17.0 | 16.0 | 54.6 | 50.0 | 71.4 | 54.2 |
| Fuson | (31.5) | 45.2 | 25.6 | 75.4 | 72.0 | 57.8 | 31.6 |

Notice that flax meal in 5 pounds per barrel concentration rates good initially but the effects are not permanent as shown by the 2-hour tap water test. This high concentration of potassium chloride gave good results on the Fuson shale, but was at most fair on the other shales.

Table V shows the effectiveness of various coating agents (including flaxseed gum) when combined with potassium chloride.

TABLE V

Base Fluid: Tulsa Tap Water
15 lb/bbl KCl
1 lb/bbl Coating Agent

| Coating Agent | Shale Recovery - 16 hr/2 hr (wt.%) | | | |
| | Coal Pit | South Texas | Thermopolis | Fuson |
|---|---|---|---|---|
| (MBT Value) | (6) | (16.5) | (24) | (31.5) |
| Cellulosic Polymer | 60.8/52.0 | 71.4/52.8 | 81.8/74.0 | 77.4/73.8 |
| Modified Starch | 55.0/46.2 | 68.8/50.6 | 79.2/70.6 | 74.0/70.8 |
| Hec/Biopolymer | 74.0/61.8 | 71.2/58.4 | 80.2/71.4 | 80.0/76.4 |
| Flaxseed Gum | 89.2/80.6 | 94.2/78.2 | 90.2/83.6 | 84.0/81.0 |

In the tests illustrated in Table V, 15 pounds per barrel of potassium chloride was used, together with 1 pound per barrel of the other agent (the 1 pound per barrel of flaxseed gum was, for convenience, added in the form of 10 pounds per barrel of flax meal). It can be seen that the flaxseed gum/potassium chloride combination of this invention was the only one which gave good-to-excellent results with all shales. In every case it gave the best results. In one additional test (not shown), the combination of an experimental cationic starch with KCl gave results which were generally good, but not as good as the flax meal.

Table VI shows results of tests with Montrose shale samples taken from North Sea wells. The 16-hour tests were run using sea water, as a seawater-based drilling fluid is desirable for North Sea drilling.

TABLE VI

| Material | Amount lb/bbl | Shale Recovery (wt.%) | |
|---|---|---|---|
| | | 16 hr | 2 hr |
| No additive | — | 24.4 | 8.8 |
| Flaxseed Gum | .5 | 51.0 | 24.0 |
| Acrylamide Polymer | .5 | 52.0 | 9.2 |
| Cellulosic Polymer | 1 | 55.4 | 36.8 |
| KCl | 30 | | |
| Flaxseed Gum | .5 | 72.4 | 66.8 |
| KCl | 30 | | |
| Acrylamide Polymer | .5 | 58.4 | 54.4 |
| KCl | 30 | | |
| Cellulosic Polymer | 1 | 70.8 | 34.8 |

The results of Table VI correlate well with field results. All of the agents, including flax meal without potassium chloride, which resulted in 55% or less recovery in these tests, also gave poor results in the field. Only the flax meal/KCl combination of this invention, which gave fair-to-good results in laboratory tests, shows promise of effectively drilling this very troublesome shale.

As the cation is the effective portion, other soluble potassium salts can be used, but potassium chloride is preferred because of its low cost. Ammonium salts (especially ammonium sulfate) when used with flaxseed gum produced results generally similar to those obtained with KCl.

Gilsonite is difficult to evaluate in the laboratory but has proved effective in wells, apparently being forced into the surface of the shale and both holding the shale together and preventing water from entering the shale. Cuttings obtained from wells in which gilsonite was used have shown gilsonite in the microfractures of the shale. The gilsonite is extremely difficult to remove from the shale and, while this contributes to gilsonite's effectiveness, it makes formation evaluation virtually impossible; thus, if such evaluations are required, gilsonite should not be used.

Generally, the drilling fluid can be prepared by dissolving about 20 pounds per barrel of potassium chloride (about 29,470 ppm of potassium ion) in sea water and adding about 10 pounds per barrel of flax meal. The non-clay based viscosifier (such as carboxymethyl cellulose, hydroxyethyl cellulose, or hydroxyethyl cellulose plus biopolymer) is then added to obtain a desired viscosity, as known in the art. Any of these materials may be used as viscosifiers, typically, in a concentration of about 1 pound per barrel. The preferred viscosifier is hydroxyethyl cellulose plus a biopolymer which is a heteropolysaccharide produced by the bacterium *Xanthomonus campestris* NRRL B-1459. Such hydroxyethyl cellulose/polysaccharide viscosifier are well-known in the drilling art, e.g., see U.S. Pat. No. 3,953,336.

Preferably, the amount of potassium chloride is varied depending on the salinity of the water. Our testing has shown that in a seawater drilling fluid approximately $2\frac{1}{2}$ times the amount of potassium chloride is required, as is necessary for fresh water fluids. In saturated salt water, the ratio should be increased to $3\frac{1}{2}$ times.

Further, it has been discovered that there is a relationship between the MBT value of the shale being drilled and the amount of potassium chloride required to maintain the necessary concentration. For every 100 pounds of shale drilled, the amount of potassium chloride (in pounds) which should be added is equal to from about one-tenth to one-twentieth the MBT value of the shale.

Generally, of course, a well is drilled using conventional (non-stabilizing) drilling fluids until a shale formation is encountered. Samples of the shale should than be taken to be tested to determine its MBT value. The shale-stabilizing drilling mud is then prepared using the composition as above described, also including about 1 to 5 pounds per barrel of gilsonite if formation evaluation considerations permit. As the drilling progresses, additional potassium chloride is added. The weight of potassium chloride to be added is preferably equal to the MBT value of the shale times the weight of shale drilled divided by 1500. Thus, if the MBT value of the shale is 15 and the shale is being drilled at a rate of 100 pounds per hour, KCl should be added at a rate of 1 pound per hour. While the KCl can be added periodically, it is preferably added continuously. Flax meal is preferably also added generally at a rate of about 1 to 3 pounds per foot of hole drilled. Once the shale formation has been penetrated, drilling could be done using the conventional non-stabilizing aqueous drilling fluid, but it is generally more convenient to continue drilling with the same fluid and just stop and KCl and flax meal additions. An even more conservative approach is to continue the additions but at about one-fifth the rate.

As the special stabilizing chemicals add significantly to the cost of the drilling fluid, and while they can be used up to the limit of solubility, cost considerations make it expedient to use the minimum amounts of these additives; thus, for example, the cation concentration in the salt additive (generally either potassium chloride or ammonium sulfate, or both) should be such that the cation concentration in parts per million is about 10,000 to 35,000. Generally, for sea water, the cation concentration should be between 25,000 and 35,000 ppm. It should be noted, however, that if the drilling fluid is in contact with a salt formation, the concentration should be somewhat higher.

The invention is not to be construed as limited to the particular forms disclosed herein, since these are to be regarded as illustrative rather than restrictive. The invention is intended to cover all compositions and processes which do not depart from the spirit and scope of the invention.

We claim:

1. A clay-free aqueous drilling fluid comprising:
   (a) 0.2 to 1.5 pounds per barrel of flaxseed gum;
   (b) a predetermined amount of at least 1 salt having a cation selected from the group consisting of potassium and ammonium, said amount providing a cation concentration in said drilling fluid of at least 10,000 ppm; and (c) a non-clay viscosifier selected from the group consisting of carboxymethyl cellulose, hydroxyethyl cellulose, and hydroxyethyl cellulose plus a heteropolysaccharide produced by the bacterium *Xanthomonus campestris* NRRL B-1459.

2. The drilling fluid of claim 1 wherein said cation concentration in parts per million is at least $10,000 \times (1 + 0.025 \times$ the percent saturation of sodium chloride in said drilling fluid).

3. The drilling fluid of claim 1 wherein said cation concentration is between 10,000 and 35,000 ppm.

4. The drilling fluid of claim 3 wherein sea water is used and wherein said cation concentration is between 25,000 and 35,000 ppm.

5. The drilling fluid of claim 2 wherein said drilling fluid contains between 1 and 5 pounds per barrel of gilsonite.

6. A well drilling method comprising:
(a) drilling an initial non-shale portion of the well circulating in the well while drilling a non-stabilizing drilling fluid; and
(b) switching to a stabilizing clay-free aqueous-based drilling fluid and continuing drilling with said stabilizing drilling fluid when the shale is encountered, said stabilizing drilling fluid comprising 0.2 to 1.5 pounds per barrel of flaxseed gum, and a predetermined amount of at least 1 salt have a cation selected from the group consisting of potassium and ammonium, said amount providing a cation concentration of at least 10,000 ppm, and a non-clay viscosifer selected from the group consisting of carboxymethyl cellulose, hydroxyethyl cellulose and hydroxyethyl cellulose plus a heteropolysaccharide produced by the bacterium *Xanthomonus campestris* NRRL B-1459.

7. The method of claim 6 wherein samples of the shale are taken and subjected to an MBT analysis, and wherein said salt is potassium chloride, and an amount of potassium chloride is added at least periodically as said drilling of said shale proceeds, the weight of potassium chloride added being equal to the MBT value of the shale times the weight of shale which is drilled divided by 1500.

8. The method of claim 7 wherein the addition of potassium chloride is terminated after said shale formation has been penetrated.

* * * * *